United States Patent [19]

Upadhyaya

[11] 3,890,280

[45] June 17, 1975

[54] POLYMERIZATION OF 2-PYRROLIDONE WITH ALKALI METAL BICARBONATE AS CATALYST

[75] Inventor: Janardan D. Upadhyaya, Stamford, Conn.

[73] Assignee: Chevron Research Company, San Francisco, Calif.

[22] Filed: May 15, 1970

[21] Appl. No.: 37,935

Related U.S. Application Data

[63] Continuation-in-part of Ser. No. 814,197, April 7, 1969, abandoned.

[30] Foreign Application Priority Data

Mar. 31, 1970 South Africa.................... 70/2153

[52] U.S. Cl. ....................... 260/78 P; 260/31.2 N
[51] Int. Cl. ........................................... C08g 20/16
[58] Field of Search .................... 260/78 P, 78 L

[56] References Cited

UNITED STATES PATENTS

| | | | |
|---|---|---|---|
| 2,638,463 | 5/1953 | Ney et al. ........................... | 260/78 P |
| 2,907,755 | 10/1959 | Lautenschlager et al. ........ | 260/78 P |
| 3,017,393 | 1/1962 | Ney ................................... | 260/78 P |
| 3,026,301 | 3/1962 | Ney ................................... | 260/78 P |
| 3,052,654 | 9/1962 | Roth et al. .......................... | 260/78 P |
| 3,061,593 | 10/1962 | Taber ................................. | 260/78 P |
| 3,072,615 | 1/1963 | Riedesel ............................. | 260/78 P |
| 3,075,953 | 1/1963 | Carlson et al. .................... | 260/78 P |
| 3,180,855 | 4/1965 | Black ................................. | 260/78 P |

*Primary Examiner*—Harold D. Anderson

[57] ABSTRACT

2-Pyrrolidone is polymerized to a white polymer having a narrow molecular weight distribution using an alkali metal bicarbonate as the polymerization catalyst.

14 Claims, No Drawings

POLYMERIZATION OF 2-PYRROLIDONE WITH ALKALI METAL BICARBONATE AS CATALYST

This application is a continuation-in-part of U.S. patent application, Ser. No. 814,197, filed Apr. 7, 1969 now abandoned.

This invention relates to the polymerization of 2-pyrrolidone using an alkali metal bicarbonate as the polymerization catalyst.

Methods for the polymerization of 2-pyrrolidone to form polypyrrolidone have been previously disclosed, for example, in U.S. Pat. Nos. 2,638,463, 2,809,958 and 2,891,038. In general, these methods involve the polymerization of 2-pyrrolidone in the presence of an alkaline polymerization catalyst, and preferably with an activator.

The polymer formed from 2-pyrrolidone is believed to be a linear polyamide, which has come to be known as nylon-4, having the structure:

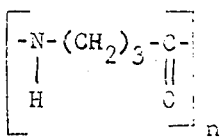

The polymer may be shaped into ribbons, films, molded articles and fibers.

It is an object of this invention to provide polymers of 2-pyrrolidone that can be converted into useful shaped articles, such as fibers, micro-fibers, filaments, rods, bristles, films, ribbons and the like, by the inexpensive method of melt extrusion.

A further object of this invention is to provide polymers of 2-pyrrolidone that will retain their desirable properties after melt extrusion.

A further object of the invention is to provide a white polymer of 2-pyrrolidone that can be subjected to melt extrusion.

Still another object of the invention is to provide a high molecular weight polymer having a narrow molecular weight distribution, substantially free of detrimental low molecular weight material.

Further objects and advantages of the invention will be apparent from the description of the invention which follows hereafter.

In general, the objects of the invention are carried out by heating a mixture of 2-pyrrolidone and an alkali metal bicarbonate, i.e., sodium, potassium, rubidium, cesium or francium bicarbonate, at a temperature of at least 120°C to form an active polymerizate, and then polymerizing the 2-pyrrolidone to provide a polymer of 2-pyrrolidone having a dispersity ratio of not more than about 5, and generally not more than about 3. The dispersity ratio is the ratio of the average weight molecular weight (Mw) to the average number molecular weight (Mn). The dispersity ratio can be calculated by dividing the weight average molecular size (Aw) by the number average molecular size (An). A preferred class of polymers have a dispersity ratio of not more than about 5 and an inherent viscosity of about 3 to about 5.

Polymers of 2-pyrrolidone having a dispersity ratio of not more than about 5 are capable of melt spinning into fibers of the finest quality, whereas prior art polymers, which had dispersity ratios far in excess of 5, generally could not be melt spun. The molecular weight distribution curves of these new polymers have the shape of the typical Gaussian distribution curve.

Additionally, the polymers of 2-pyrrolidone of the present invention characteristically have an inherent viscosity of at least about 2, e.g. at least about 2.5, and range as high as about 8 to about 10 deciliters per gram, whereas the prior art polymers have not achieved such high viscosities. The polymers of the present invention have a preferred range of inherent viscosity of from about 3 to about 5.

The polymers of 2-pyrrolidone of the present invention are also characterized by a dispersity ratio of not more than about 10 and an inherent viscosity of at least about 2.

The first U.S. patent describing polymers of 2-pyrrolidone issued in 1953. While polymers of 2-pyrrolidone have been extensively investigated ever since then, there has never been a disclosure of polymers of 2-pyrrolidone having the characteristics of the new polymers of the present invention.

For example, prior art polymers of 2-pyrrolidone characteristically have skewed molecular weight distribution curves due to a considerable amount of low molecular weight polymer being present. This undesirable range in molecular size is indicated by unusually high dispersity ratios, Mw/Mn, which for prior art polymers can be as high as 15 or more, such as 70.

These properties are in marked contrast to those of the fiber-forming polymers now in commercial use, such as nylon-6, nylon-6,6, polyesters, etc., all of which have Gaussian molecular weight distribution curves and dispersity ratios ranging from about 2.0 to 4.0.

The new polymer of 2-pyrrolidone of the present invention has a narrow molecular weight distribution with mostly high molecular weight species being present and substantially none of the low molecular weight material present, which makes it ideally suited for melt extrusion into films or fibers. The new polymer of the invention may also be used as a molding powder. Shaped articles made from the new polymer of the invention, whether molded products films or fibers, show greatly improved strength characteristics while at the same time retaining the other superior physical properties characteristic of polymers of 2-pyrrolidone. Further, the new polymer can be subjected to wet spinning.

It is also a feature of the new polymer of the invention that while the molecular weight of the polymer is markedly increased, it is still a white polymer meeting the highest standards of whiteness. This is indeed remarkable, since prior art attempts to obtain high molecular weight polymer usually led to a yellowish or otherwise discolored nylon-4 polymer. Another remarkable aspect of the present invention is that the high molecular weight and white color are consistently obtained, thereby making possible the commercial production of melt-spinnable nylon-4 polymer.

The new polymer of the invention can be prepared by polymerizing 2-pyrrolidone using an alkali metal bicarbonate as the sole catalyst species. Whereas it has long been thought that 2-pyrrolidone requires both an alkaline polymerization catalyst and an activator (or cocatalyst) in order to be polymerized rapidly, it has been found that an alkali metal bicarbonate can be used as the only catalyst species for the polymerization.

It is indeed surprising and unexpected that the use of alkali metal bicarbonates as polymerization catalysts results in the production of polymers of 2-pyrrolidone having narrow molecular weight distribution and high viscosity, since no other alkaline polymerization catalyst is known that gives this result.

2-pyrrolidone is polymerized according to the present invention by first heating a mixture of 2-pyrrolidone and an alkali metal bicarbonate and then permitting the polymerization to proceed. This heating step is carried out at a temperature of at least 120°C, such as from about 120°C to about 200°C, preferably from about 140°C to about 160°C and most preferably from 140°C to 150°C. In general, the mixture of 2-pyrrolidone and alkali metal bicarbonate is heated for at least about 30 minutes, and a heating time of from about 30 minutes to about 180 minutes can be used, preferably from 45 minutes to 120 minutes, and most preferably from about 60 minutes to about 90 minutes.

The heating of the mixture of 2-pyrrolidone and the alkali metal bicarbonate serves to "activate" the mixture, in the sense that in the absence of this heating the polymerization will proceed at very low rates, resulting in very poor conversion of monomer to polymer and production of undesirably low molecular weight polymer. By heating the mixture of 2-pyrrolidone and alkali metal bicarbonate as described, the desired high molecular weight polymer is obtained at reasonable times and in good yield. The temperature of 120°C is chosen as the lower limit for the activation step, because lower activation temperatures require excessively long heating times and result in low conversion rates, low yields and low molecular weight polymer. In general, while increasing the time and temperature of heating will enhance the polymerization, a maximum effect appears to be achieved at a temperature of about 140° to 160°C, most preferably 140° to 150°C, for about 45 minutes to 90 minutes, most preferably 60 minutes to 90 minutes.

It is desirable to remove the water formed by the reaction of 2-pyrrolidone and the alkali metal bicarbonate, as well as any other water present, and this is conveniently accomplished by distilling off water during the activation step. Further, after distillation of the water, some monomer, e.g. 10–25% by volume, can also be distilled off during the activation step to insure complete water removal, but this is not essential. Any desired pressure can be used during the activation step, but it is preferred to operate under vacuum, such as 10 to 50 mm Hg, to assist in the removal of the water. While not preferred, the removal of water from the mixture of 2-pyrrolidone and alkali metal bicarbonate can be at temperatures below 120°C, and then the activation step at a temperature of at least 120°C can follow the water removal.

After the activation step is completed, the polymerizate is ready for polymerization. At this stage, the polymerizate is simply kept at the desired polymerization temperature for the desired period of time. Generally, the polymerizate is cooled and the 2-pyrrolidone monomer polymerized at a temperature from about 18°C to about 100°C, preferably 25°C to 70°C, and most preferably 25°C to 60°C, under a pressure ranging from subatmospheric to superatmospheric. Bulk polymerization or suspension polymerization can be used. A technique using an anhydrous non-solvent, such as hydrocarbon, is suitable, as described in U.S. Pat. No. 2,739,959.

It is preferred to utilize the alkali metal bicarbonate as the sole polymerization catalyst species, since this gives the desired polymer having the narrow molecular weight distribution. However, another catalyst species can be included if it does not unduly broaden the molecular weight distribution, as reflected by an increase in the dispersity ratio, and/or if it does not unduly decrease the molecular weight of the polymer, as reflected by a decrease in the inherent viscosity. For example, $CO_2$ may be used as an additional catalyst species by bubbling dry $CO_2$ gas through the mixture of 2-pyrrolidone and alkali metal bicarbonate before, after or during the heat activation step. The $CO_2$ can be bubbled through the activated mixture of 2-pyrrolidone and alkali metal bicarbonate while it is still hot or after it has been cooled. $CO_2$ can be added at any pressure and any temperature, suitable temperatures ranging from the freezing point of the polymerizate to 130°C or higher. Normally, the $CO_2$ is added until the polymerizate ceases to absorb any further amounts of $CO_2$. A range of 0.01 to 10 wt. percent of $CO_2$, based on the weight of 2-pyrrolidone is suitable, preferably 0.2 to 6 wt. percent, and most preferably 0.5 to 5 wt. percent.

The use of $CO_2$ in the polymerization of 2-pyrrolidone is disclosed and claimed in Carl E. Barnes application Ser. No. 763,898, filed Sept. 30, 1968, now abandoned, and in the continuation-in-part application thereof, application Ser. No. 69,471, filed Sept. 3, 1970.

The amount of the alkali metal bicarbonate used in the present invention can be from about 0.1 to about 20 mol percent, preferably from about 1 to about 10 mol percent, based on the 2-pyrrolidone monomer.

The alkali metal bicarbonates are not all equally effective as polymerization catalysts. The rate of polymerization of 2-pyrrolidone using rubidium bicarbonate is significantly higher than with potassium bicarbonate, and the polymerization rate using potassium bicarbonate is significantly higher than with sodium bicarbonate. Consequently, potassium and rubidium bicarbonates are preferred.

It is preferred that the 2-pyrrolidone monomer be purified, e.g. by fractional distillation under reduced pressure or by recrystallization or a combination of both. Distillation at about 80° to 150°C under reduced pressure, such as about 0.5 to about 50 mm Hg., has been found suitable.

A preferred purification technique is as follows. Commercially available 2-pyrrolidone is subjected to aqueous caustic hydrolysis to hydrolyze impurities such as amides and esters, and primarily to hydrolyze any amides of 1,4-diaminobutane. Good results have been obtained by using 20 grams of potassium hydroxide (reagent grade) and 100 grams of water per liter of 2-pyrrolidone. The mixture is boiled under reflux for 15 minutes to 24 hours, preferably 8 to 12 hours, and then a primary distillate is recovered.

The primary distillate is treated with caustic (e.g., 20 g. KOH pellets per liter) and distilled to give a new distillate. This new distillate is treated with caustic (e.g. 20 g. KOH pellets per liter) and distilled to give the purified monomer.

Alternatively, the primary distillate can be treated with acid (5 cubic centimeters of phosphoric acid per liter of distillate has been employed), and distilled, and the new distillate thus formed can be treated with caustic (e.g. 20 grams KOH pellets per liter) and distilled once more. This final distillation from caustic removes any phosphoric acid or oxide that may be carried over from the preceding acid distillation to give the purified monomer.

We are aware that U.S. Pat. No. 2,907,755 proposes the use of carbon monoxide as a co-catalyst (activator) in the polymerization of lactams having 4–9 carbon atoms together with an alkaline polymerization catalyst. Among the alkaline polymerization catalysts proposed in the U.S. Patent are the alkali metal bicarbonates. However, no examples are given in the U.S. patent of any polymerization using an alkali metal bicarbonate either alone or even in combination with carbon monoxide.

The following specific examples are intended to illustrate the invention more fully and are not intended to limit its scope. The references in the disclosure, Examples and claims herein to inherent viscosity refer to inherent viscosity determined using 5% polymer solutions in formic acid.

EXAMPLE 1

1600 ml of 2-pyrrolidone which had been carefully purified was placed in a flask equipped for vacuum distillation, and 100 g. (1 mol) of potassium bicarbonate was added. The flask was swept with dry nitrogen, placed under reduced pressure of about 30–40 mm Hg. while maintaining dry nitrogen purge, and then approximately 700 ml of distillate was collected by heating the flask to a temperature of about 140°–150°C for a period of about 60–90 minutes. This distillate is rich in 2-pyrrolidone and is sufficient to insure an essentially anhydrous residue in the flask.

The vacuum was broken with dry nitrogen and the contents of the flask were cooled to approximately 50°C and then transferred to a polyethylene container and tightly capped with an aluminum foil-lined cap. Then the polyethylene container was placed in an oven maintained at 50°C. After 24 hours, the reaction mass solidified; at the end of 44 hours the polymerization vessel was removed from the oven.

The resulting polymer was ground to a granular consistency followed by six washing operations using excess deionized water each time. The snow-white, wet granular solid was then dried at about 80°C for about 15 hours. The conversion of monomer to polymer was 41%, calculated by dividing the weight of dry polymer recovered after the six washings by the weight of the granular polymer before the six washings and multiplying this by 100.

A polymer was obtained having an inherent viscosity of 3.0 deciliters per gram using 5% polymer in formic acid relative to a Gardner Bubble viscosity standard. By gel permeation chromatography, the average number molecular size (An) was found to be 6,300 Angstroms and the average weight molecular size was found to be 15,000 Angstroms, thereby giving a dispersity ratio of 2.4.

EXAMPLE 2

The procedure of Example 1 was duplicated except that the polymerization was not terminated until 96 hours after the flask was placed in the oven. The conversion was 53% and the polymer thus obtained had an inherent viscosity of 3.7. By gel permeation chromatography, the number average molecular size (An) was found to be 3,996 Angstroms, the weight average molecular size (Aw) was 13,300 Angstroms and the dispersity ratio was thus 3.3.

EXAMPLES 3–6

The procedure of Example 1 was duplicated using different ratios of monomer to potassium bicarbonate. Table 1 sets forth the amounts of monomer and bicarbonate, the amount of distillate collected and the polymerization time and results.

Table 1

| Example | 3 | 4 | 5 | 6 |
|---|---|---|---|---|
| 2-pyrrolidone (ml) | 2960 | 2960 | 3000 | 3000 |
| Bicarbonate | $KHCO_3$ | $KHCO_3$ | $KHCO_3$ | $KHCO_3$ |
| Amount of bicarbonate (g) | 150 | 150 | 50 | 50 |
| Amount of distillate collected (ml) | 1150 | 1150 | 500 | 500 |
| Polymerization time (hr.) | 72 | 96 | 72 | 96 |
| Conversion (%) | 52 | 59 | 43 | 37 |
| Inherent viscosity (dl/g) | 3.35 | 3.35 | 2.8 | 2.75 |

EXAMPLE 7

The procedure of Example 1 was duplicated except that 1,000 ml of 2-pyrrolidone were used and 50 grams of rubidium bicarbonate were used in place of the $KHCO_3$. 350 ml of distillate were collected and the polymerization time was 60 hours. A polymer was obtained in a conversion of 73% having an inherent viscosity of 3.45. By gel permeation chromatography, the number average molecular size (An) was found to be 3,600A, the weight average molecular size (Aw) was found to be 12,200A giving a dispersity ratio of 3.40.

EXAMPLE 8

The procedure of Example 1 was duplicated except that 1,400 ml of 2-pyrrolidone were used, and 50 grams of cesium bicarbonate were used in place of $KHCO_3$. 580 ml of distillate were collected, and the polymerization time was 21 hours. The polymer was obtained in a conversion of 9% and had an inherent viscosity of 2.70.

EXAMPLE 9a

Five grams of a nylon-4 polymer (Sample A) of the prior art having an inherent viscosity of 2.0, prepared using potassium pyrrolidonate as the catalyst and acetyl pyrrolidone as the activator for the polymerization, was placed in a Slocumb Melt Indexer modified to include a single hole spinnerette in the bottom. This nylon-4 polymer is typical of the best nylon-4 polymer previously available to melt spinning. The polymer was heated under pressure to 270°C and held for a period of 4 minutes with the spinnerette hole closed. At the end of this period, the spinnerette hole was opened, but only a few drops of liquid emerged accompanied by considerable vapor. No fiber could be formed.

EXAMPLE 9b

The procedure of Example 9a was followed using a 5 gram sample of nylon-4 polymer (Sample B) produced by polymerizing 2-pyrrolidone using potassium pyrrolidonate and carbon dioxide as the catalyst system and having an inherent viscosity of 3.1. At the end of the 4 minutes of heating at 270°C, the spinnerette hole was opened, and a strand of fiber emerged. The fiber continued to emerge for 9.4 minutes at which time all the 5 gram sample had been spun into fiber.

EXAMPLE 9c

The procedure of Example 9a was followed using a 5 gram sample of the polymer produced in Example 1. The extrusion time was 8.3 minutes and a fiber was easily formed.

This Slocumb Melt Indexer test described above subjects the nylon-4 polymer to conditions of drastic severity for nylon-4. A nylon-4 polymer that can pass this test by being capable of spinning fiber after the 4 minute heating at 270°C will have all of the properties required to eliminate all of the difficulties heretofore encountered in melt spinning nylon-4. It is to be noted that prior art nylon-4 (Sample A) vaporized under the conditions of this test. The results of this test are summarized in the following table:

Table 2

| Sample | Inherent Viscosity (dl/g) | Melt Rheometry Melt Viscosity (poises) | Temp | Extrusion Time (min) | Remarks |
|---|---|---|---|---|---|
| A | 2.0 | 200 | 270 | 2.8 | Could not collect fibers |
| B | 3.1 | 1050 | 270 | 9.4 | Fibers collected |
| Example 1 | 3.0 | 870 | 270 | 8.3 | Fibers collected |

EXAMPLE 10

The procedure of Example 1 was duplicated except that 1,400 ml of 2-pyrrolidone were used and 100 grams of sodium bicarbonate were used in place of $KHCO_3$. 500 ml of distillate were collected and the polymerization time was 96 hours. The polymer was obtained in a conversion of 15% and had an inherent viscosity of 1.1.

EXAMPLE 11

The procedure of Example 1 is followed, except that after the distillation step, dry carbon dioxide is bubbled through the heated mixture until the pressure starts to sharply rise. At this point, the flow of carbon dioxide is stopped and the vacuum is broken with dry nitrogen. The contents of the flask are cooled to approximately 50°C and transferred to the polymerization oven in accordance with Example 1.

At the end of the polymerization, there is recovered a white, melt-extrudable polymer in good yield having a dispersity ratio of less than 5.

EXAMPLE 12a

Following the procedure of Example 12 of U.S. Pat. No. 2,907,755, 300 grams of 2-pyrrolidone and 26.4 grams of potassium bicarbonate were placed in a flask equipped for vacuum distillation. The flask was evacuated to a pressure of about 5 mm mercury and the contents of the flask were heated to a temperature of about 114°C. Distillate was taken off for about 15 minutes and 36.6 grams of distillate were collected. Nitrogen was bled into the flask to bring the pressure back to atmospheric pressure. The temperature of the contents of the flask was reduced to about 100°C and carbon monoxide was bled through the mixture in the flask for two hours. The system was cooled to room temperature and the contents of the flask were transferred into four polyethylene bottles. Samples 56-43A and 56-43C were placed in a polymerization oven at a temperature of about 50°C. Samples 56-43B and 56-43D were permitted to remain at room temperature. The polymerization temperature usually employed in accordance with the present invention is 50°C, and Example 12 of the U.S. patent employs room temperature for the polymerization. Table 3 below sets forth the results of the polymerization, and it can be seen that even after an extended period of time, both at 50°C and at room temperature, only water-soluble material was formed, indicating an extremely low molecular weight material. Water-soluble material is, of course, totally useless as a commercial material and has an inherent viscosity so low that it cannot be measured using the procedures described in the present application.

EXAMPLE 12b

By comparison, 264 grams of the same batch of 2-pyrrolidone as employed in Example 12a above and 26.4 grams of potassium bicarbonate were placed in a vessel equipped for vacuum distillation, and a vacuum was drawn until the pressure in the flask reached 25–35 mm mercury. The mixture was heated under reflux to maintain a temperature in the flask of 145°C ± 1°C for about 75 minutes, during which time water was removed. The heat was then stopped and the contents of the flask were cooled to room temperature. Using dry nitrogen, the pressure in the flask was brought back to atmospheric pressure and the contents of the flask were poured into two polyethylene polymerization vessels and both vessels placed in a 50°C oven. These vessels were designated as Samples 56-41A and 56-41B. At the end of the polymerization time in the 50°C oven as indicated below in Table 3, Samples 56-41A and 56-41B were removed from the oven and worked up as in Example 1. In both cases, a white, melt-extrudable polymer having a dispersity ratio of less than 5 was obtained in a conversion and having an inherent viscosity as set forth below in Table 3.

Table 3

| Samples | Polymerization Temp. | Polymerization Time (hrs) | Conversion (%) | Inherent Viscosity (dl/g) |
|---|---|---|---|---|
| 56-43A | 50°C | 22 | ** | ** |
| 56-43B | RT* | 22 | ** | ** |
| 56-43C | 50°C | 144 | ** | ** |
| 56-43D | RT* | 144 | ** | ** |
| 56-41A | 50°C | 22 | 4 | 2.5 |
| 56-42B | 50°C | 144 | 18 | 2.8 |

*RT means room temperature
**could not be determined due to formation of water-soluble material only

What is claimed is:

1. A process for the production of a polymer of 2-pyrrolidone in solid form, which consists essentially of heating a mixture of 2-pyrrolidone and an alkali metal bicarbonate polymerization catalyst to a temperature of at least about 120°C, and then polymerizing the 2-pyrrolidone in the presence of said catalyst.

2. The process according to claim 1, wherein the mixture of 2-pyrrolidone and said alkali metal bicarbonate are heated at a temperature in the range of 120°C to 200°C for 30 to 180 minutes.

3. The process according to claim 2, wherein the heating is at a temperature in the range of 140°C to 160°C for 45 to 120 minutes.

4. The process according to claim 2, wherein the heating is at a temperature in the range of 140°C to 150°C for 60 to 90 minutes.

5. The process according to claim 2, wherein the alkali metal bicarbonate is sodium bicarbonate.

6. The process according to claim 2, wherein the alkali metal bicarbonate is potassium bicarbonate.

7. The process according to claim 2, wherein the alkali metal bicarbonate is rubidium bicarbonate.

8. The process according to claim 2, wherein the alkali metal bicarbonate is cesium bicarbonate.

9. A process for the production of a polymer of 2-pyrrolidone in solid form which comprises heating a mixture of 2-pyrrolidone and an alkali metal bicarbonate polymerization catalyst to a temperature of at least about 120°C, said mixture of 2-pyrrolidone and said alkali metal bicarbonate being contacted with carbon dioxide as a polymerization activator before, during or after said heating, and then polymerizing the 2-pyrrolidone in the presence of said catalyst.

10. The process according to claim 9, wherein the mixture of 2-pyrrolidone and said alkali metal bicarbonate are heated at a temperature in the range of 120°C to 200°C for 30 to 180 minutes.

11. The process according to claim 10, wherein the heating is at a temperature in the range of 140°C to 160°C for 45 to 120 minutes.

12. The process according to claim 10, wherein the alkali metal bicarbonate is potassium bicarbonate or rubidium bicarbonate.

13. A process for the production of a polymer of 2-pyrrolidone in solid form, which consists essentially of the steps of heating a mixture of 2-pyrrolidone and an alkali metal bicarbonate polymerization catalyst to a temperature in the range of 120°C to 200°C for 30 to 180 minutes, cooling the heated mixture to a polymerization temperature of up to about 100°C, and polymerizing the 2-pyrrolidone at said polymerization temperature in the presence of said catalyst, the water formed from reaction between the 2-pyrrolidone and the alkali metal bicarbonate and any other water being removed prior to the polymerization to provide an essentially anhydrous mixture for polymerization.

14. A process for the production of a polymer of 2-pyrrolidone in solid form, which comprises heating a mixture of 2-pyrrolidone and an alkali metal bicarbonate polymerization catalyst to a temperature in the range of 120°C to 200°C for 30 to 180 minutes, cooling the heated mixture to a polymerization temperature of up to about 100°C, said mixture of 2-pyrrolidone and said alkali metal bicarbonate being contacted with carbon dioxide as a polymerization activator before, during or after said heating, and then polymerizing the 2-pyrrolidone at said polymerization temperature in the presence of said catalyst, the water formed from reaction between the 2-pyrrolidone and the alkali metal bicarbonate and any other water being removed prior to the polymerization to provide an essentially anhydrous mixture for polymerization.

* * * * *